(12) United States Patent
Sanns

(10) Patent No.: US 7,104,591 B1
(45) Date of Patent: Sep. 12, 2006

(54) WINDBREAKER AIR DRAG REDUCTION SYSTEM

(76) Inventor: Randy A. Sanns, 1222 S. 107th St., West Allis, WI (US) 53214

( * ) Notice: Subject to any disclaimer, the term of this patent is extended or adjusted under 35 U.S.C. 154(b) by 0 days.

(21) Appl. No.: 11/384,854

(22) Filed: Mar. 20, 2006

Related U.S. Application Data

(60) Provisional application No. 60/596,551, filed on Oct. 3, 2005.

(51) Int. Cl.
*B60R 27/00* (2006.01)

(52) U.S. Cl. .................................. 296/180.1; 296/180.5

(58) Field of Classification Search ............ 296/180.1, 296/180.2, 180.3, 180.4, 180.5
See application file for complete search history.

(56) References Cited

U.S. PATENT DOCUMENTS

| | | | | |
|---|---|---|---|---|
| 3,815,948 A | * | 6/1974 | Alford | 296/180.4 |
| 3,866,968 A | * | 2/1975 | Donahue | 296/180.4 |
| 3,971,586 A | | 7/1976 | Saunders | |
| 3,977,716 A | | 8/1976 | Whited | |
| 4,021,069 A | | 5/1977 | Hersh | |
| 4,131,309 A | * | 12/1978 | Henke | 296/180.2 |
| 4,157,200 A | * | 6/1979 | Johnson | 296/180.4 |
| 4,257,641 A | * | 3/1981 | Keedy | 296/180.4 |
| 4,313,635 A | | 2/1982 | Front | |
| 4,427,229 A | | 1/1984 | Johnson | |
| 4,741,569 A | * | 5/1988 | Sutphen | 296/180.4 |
| 4,818,015 A | * | 4/1989 | Scanlon | 296/180.1 |
| 4,966,407 A | | 10/1990 | Lusk | |
| 5,332,280 A | * | 7/1994 | DuPont et al. | 296/180.1 |
| 6,092,861 A | * | 7/2000 | Whelan | 296/180.2 |
| 2004/0119319 A1 | * | 6/2004 | Reiman et al. | 296/180.1 |

* cited by examiner

*Primary Examiner*—Lori L. Coletta
(74) *Attorney, Agent, or Firm*—Ryan Kromholz & Manion, S.C.

(57) ABSTRACT

A windbreaker air drag reduction system for trailers and other box-like towed vehicles having a blunt-nosed forward face. The system comprises a wedge-shaped fairing element including a pair of upstanding panel members adjoining one another and being secured to an upstanding riser. The panel members and riser are attached to a crossbar member which is securely clamped to the trailer tongue support beams. The panel members are secured to the upper and lower face of forward face of the trailer at their respective outward edges. The combined components of the fairing element cooperate to form a triangular arrangement, the apex of the triangle being located forwardly of the blunt-nosed forward face of the vehicle. The entire system may be attached, detached, and reattached to multiple trailers or towed vehicles by means of simple tools and assembly and ease of use by only one operator.

9 Claims, 3 Drawing Sheets

WINDBREAKER AIR DRAG REDUCTION SYSTEM

RELATED APPLICATIONS

This application claims the benefit of co-pending Provisional Patent Application Ser. No. 60/596,551, filed on 3 Oct. 2005.

BACKGROUND OF THE INVENTION

Various prior art devices have been suggested for reducing aerodynamic drag of a moving vehicle, and more particularly to apparatus for reducing air drag on flat-nosed trailer trucks, railroad cars, and other similar blunt-nosed, towed vehicles which present a substantially broad aerodynamically resistant surface in the direction of travel of the vehicle. Of these prior art devices, there are disclosures of various provision of air vanes or fins around the edges of the cargo carrying portion of the vehicle to deflect the impinging air stream. Such devices include large blister-shaped deflectors provided with an opening for collecting impinging air, and a conduit means extending along the trailer to exit collected air at the rear portion of the trailer. Obviously, this requires a substantial modification to the trailer or similar blunt-nosed towed vehicle. Other prior art devices, although successful in varying degrees in reducing the aerodynamic resistance or drag on a vehicle, are deficient to the extent that they require either substantial modification to the towed vehicle to employ the devices, or necessitate use of a combination of several devices to achieve reduction of aerodynamic resistance in both the head flow and cross flow of air. The other prior art devices substantially increase the cost of air resistance reduction.

SUMMARY OF THE INVENTION

The present invention represents an improvement over the prior art, in that a comparatively simple, wedge-shaped fairing element is provided for mounting on the forward face of a blunt-nosed, or flat-nosed, vehicular trailer. The wedge-shaped fairing element is provided with an angular, rearwardly extending surface which is contoured for the deflection of impinging air streams from head on, quartering, and crosswise directions, to thereby substantially reduce air resistance on the trailer and to substantially improve its handling characteristics. In addition, the apparatus of the present invention is adapted for ready and facile mounting with simple fastening means, such as application by conventional clamps, brackets and screws, requiring minimal modification to the towed vehicle.

To accomplish the purpose and results of the present invention, there is provided a wedge-shaped fairing element adapted to cover at least a portion of the blunt-nosed, forward face of a box-like trailer or cargo body of a tractor or truck.

Due to its simplified construction, the novel wedge-shaped fairing element of the present invention may be packaged for shipment to an installer with a minimum number of parts, and a simplified array of conventional obtainable components for installation using conventional fastening means.

The wedge-shaped fairing element of the present invention allows for ease of installation, non-interference during vehicular operation, such as turning requirements in relatively tight spaces, and the adaptability for use with trailers of varying sizes. Other aspects and advantages of the present invention will become apparent from the following detailed description taken in conjunction with the accompanying drawings.

DESCRIPTION OF THE PREFERRED EMBODIMENT

Figure 4:
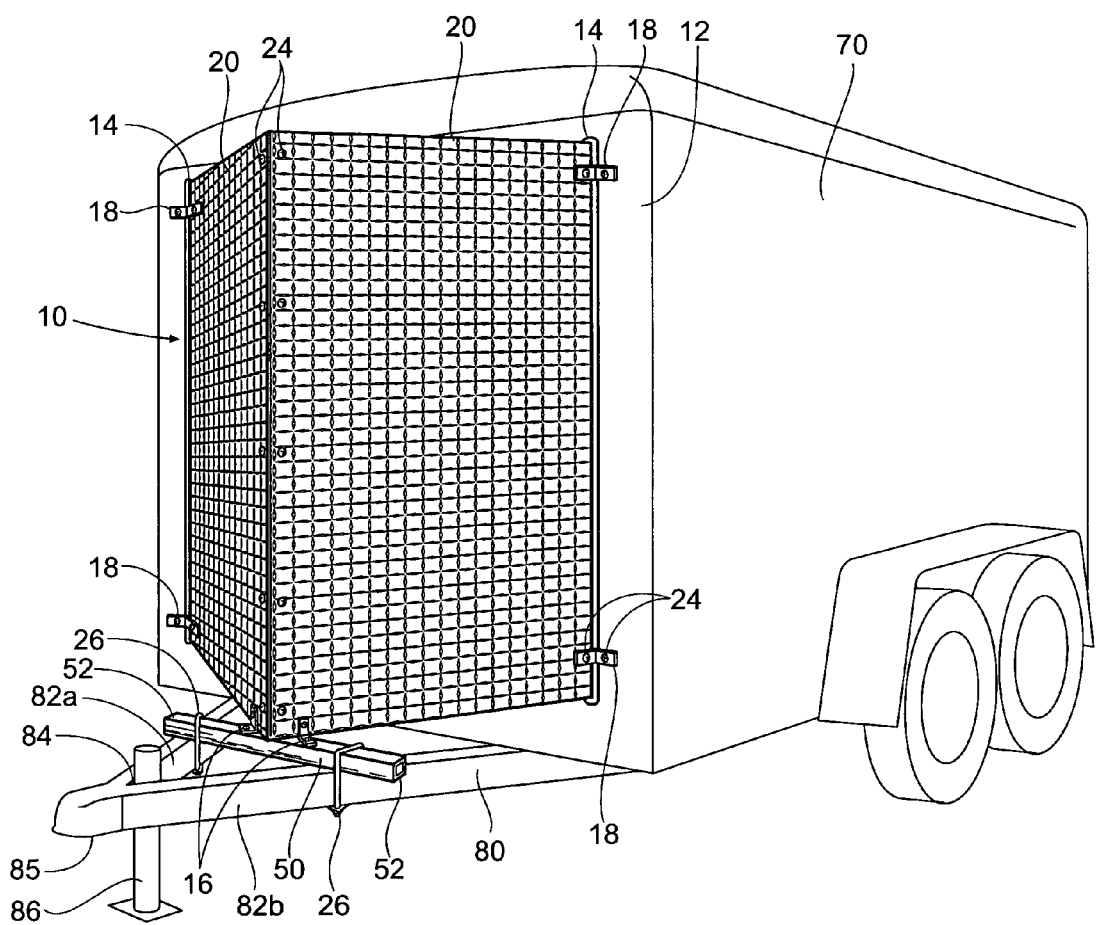
FIG. 4 is a perspective view of the wedge-shaped fairing element and its supporting elements assembled and secured to the blunt-nosed, forward face of a blunt-nosed trailer.

As shown in the drawings, the present invention is embodied in a wedge-shaped fairing element 10 which is adapted to be mounted on and secured to a blunt-nosed towed vehicle, such as a trailer 70 (see FIG. 4). When mounted, the wedge-shaped fairing element 10 is adapted for modifying the flow of air during operation of the trailer 70 thereby substantially reducing the aerodynamic drag and improving the handling characteristics of the trailer 70.

With particular attention to FIG. 4, it will be observed that the wedge-shaped fairing element 10 is preferably mounted on the blunt-nosed, forward face 12 of a conventional towed vehicle or trailer 70.

As illustrated in FIG. 4, the trailer 70 includes a conventional forward-extending hitching tongue 80. The hitching tongue 80 is composed of bifurcated, angularly extending support beams 82A and 82B, each terminating in a triangular apex 84 which is further formed with a conventional releasable hooded element 85. The hooded element 85 is arranged for releasable securement with a conventional hitch projecting from the rear of a powered hauling vehicle (not shown).

As further illustrated in FIG. 4, an extendable upright jack member 86 is located at the apex 84 of the hitching tongue 80 for elevating the forward end of the trailer 70 to a relatively level, horizontal position, as shown. This level, horizontal position of the trailer 70 enables for ease of attachment of the wedge-shaped fairing element 10. After the trailer 70 has been hitched to the powered hauling vehicle the upright jack member 86 is withdrawn from its current position so as not to interfere with the hauling operation (not shown).

Figure 2:
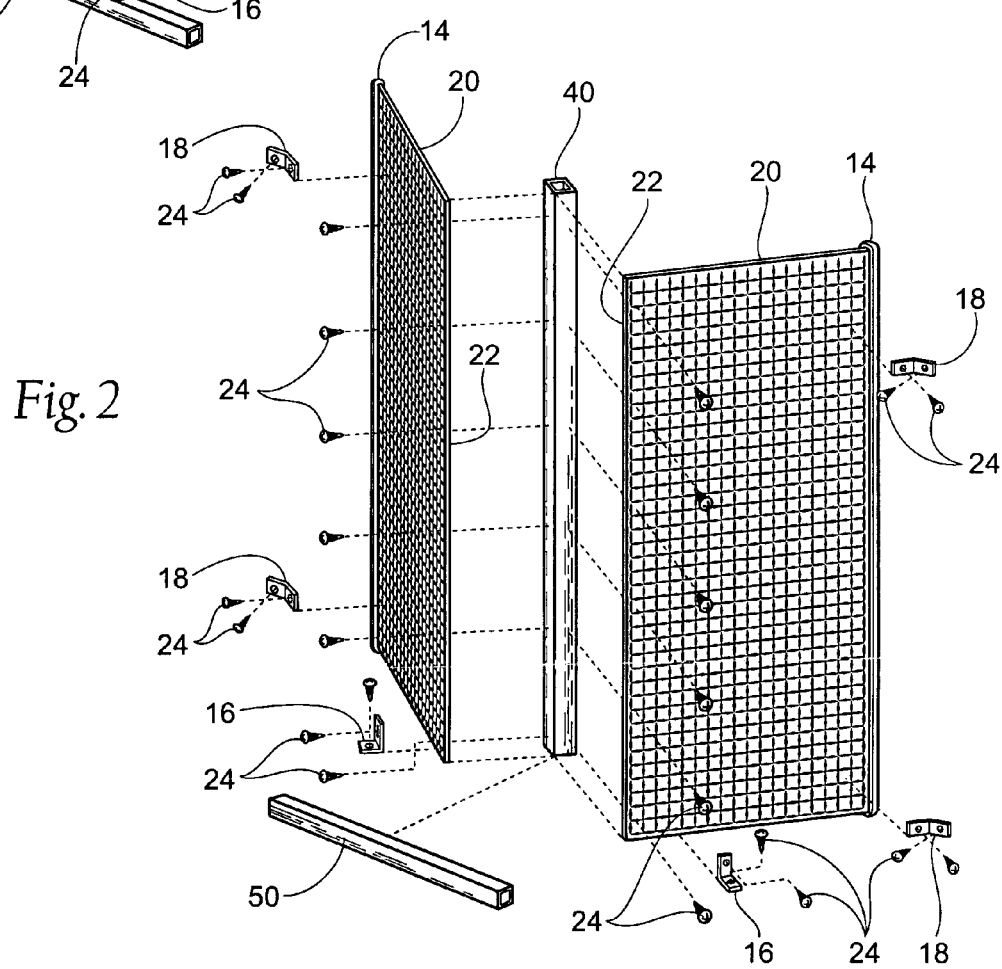
FIG. 2 is an exploded view of the cooperating components ready for assembly for providing the wedge-shaped fairing element of FIG. 1.
Figure 3:
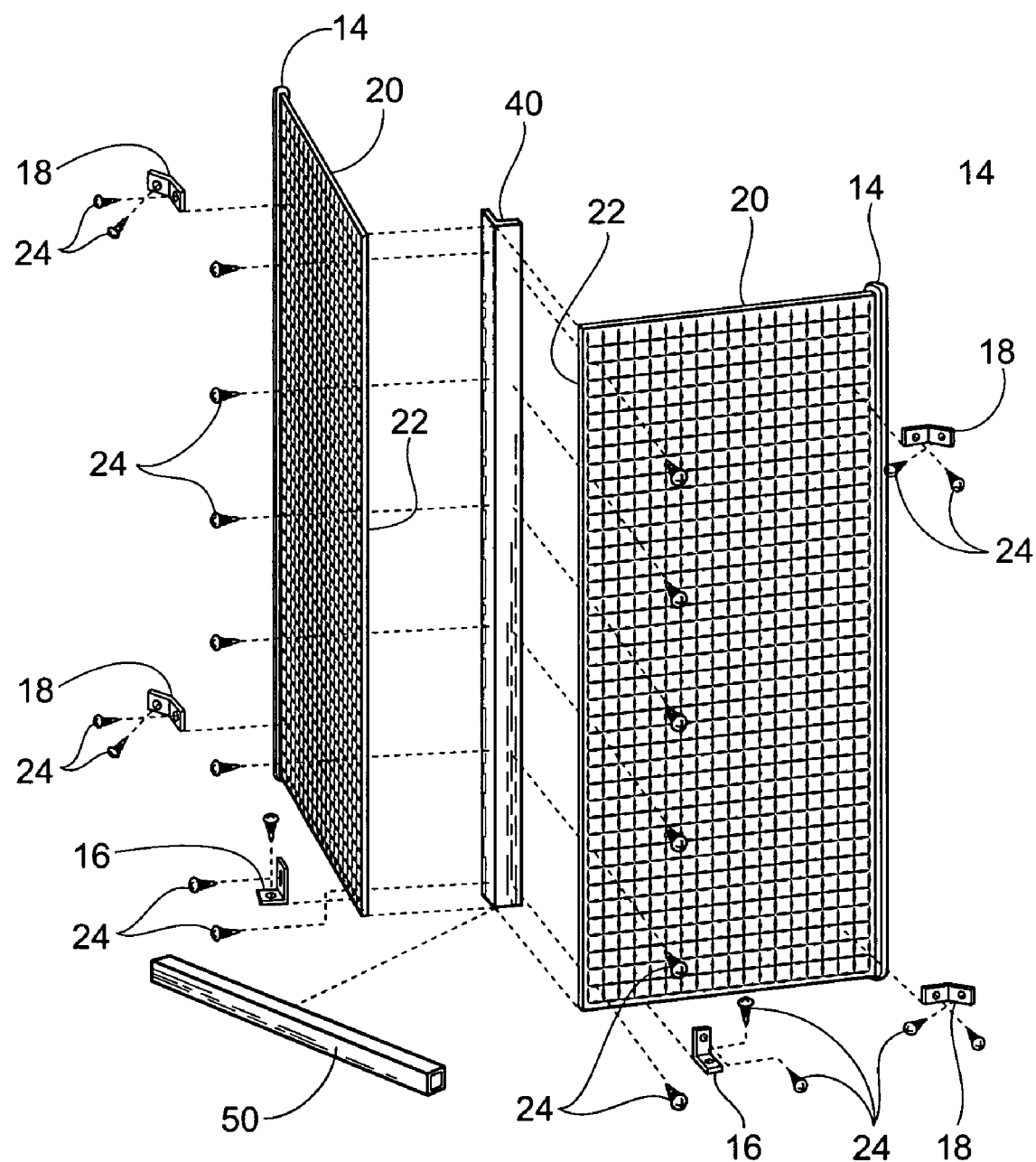
FIG. 3 is an exploded view of the cooperating components ready for assembly for providing the wedge-shaped fairing element of FIG. 1 showing angle iron as an alternate vertical support means.

With attention next being directed to the views of FIGS. 2 and 3, it will be observed that the wedge-shaped fairing element 10 comprises a minimum of ten (10) separate elements along with several self-drilling screws. These elements may be arranged for simplicity in prepackaged shipping containers (not shown). One of the elements comprises a crossbar 50 of conventional one inch square tubular material arranged for seated securement to each of the angularly extending support beams 82A and 82B of the hitching tongue 80. The wedge-shaped fairing element 10 also includes an upstanding vertical riser 40 of one inch square tubing material which is secured to intersecting edges 22 of the panels 20 which extend angularly therefrom. The panels 20 are preferably formed from sheet steel, aluminum sheet metal or Alumalite. Alumalite is a strong, lightweight, aluminum composite panel with a high density, corrugated polyallomer core that will not swell, wick water, corrode, rot, or delaminate even under prolonged water exposure.

Next, with reference to the exploded view of FIG. 2, it will be observed that the respective panel members 20 may be arranged angularly relative to one another and attached at their forward facing adjoining edges 22 to the vertical riser 40 by use of conventional self-drilling screws 24 and wherein the installer determines the screw placement.

In another embodiment, as shown in FIG. 3, the riser 40 may also take the form of a conventional angle iron, the L-shaped sides of which may serve to give further support to respective panel members 20 which are placed angularly relative to one another. Attachment of the vertical riser 40 to the panels 20 would be identical as described herein above.

Figure 1:
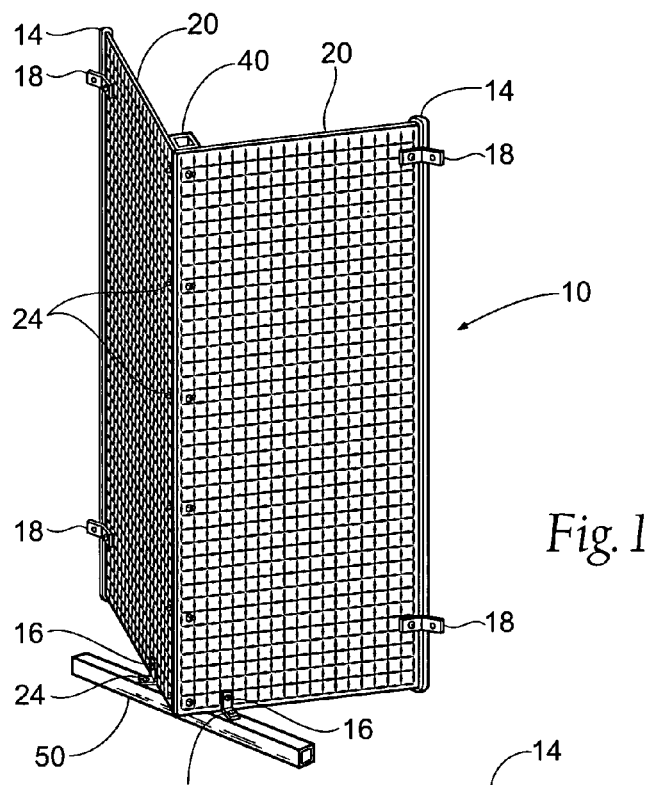
FIG. 1 is a perspective view of a wedge-shaped fairing element of this invention assembled with a minimum number of cooperating components, and ready for attachment to the forward, blunt-nosed face of a trailer.

As shown in FIG. 1, the panel members 20 are attached at their lower ends to the crossbar 50 by means of right angle brackets 16 and self-drilling screws 24.

As shown in FIG. 4, the crossbar 50, riser 40 and panel members 20, previously secured to one another and assembled as a unit, is placed on top of the horizontal support beams 82A and 82B which angularly extend from the hitching tongue 80. The unit is pushed rearward so that outward edges 14 of panel members 20 are firmly flush with the blunt-nosed forward surface 12 of the trailer 70. The outward edges 14 of panel members 20 are wrapped with foam or rubber so as not to damage or rub the blunt-nosed forward face 12 of the trailer 70 during operation. The clamps 26 are placed over outwardly extending edges 52 of crossbar 50 and tightened under support beams 82A and 82B of hitching tongue 80. Angle brackets 18 are attached with self-drilling screws 24 to the outward edges 14 of both panel members 20 and the forward face 12 of the trailer 70. Angle brackets 18 are placed at both top and bottom outward edges 14 of panel members 20 and secured to the panel members 20 and the forward face 12 of the trailer 70. Self-drilling screws 24 are placed through the angle brackets 18 screwed into the each panel member 20 and further into the forward face 12. The self-drilling screws 24 are then securely tightened to restrict movement of the wedge-shaped fairing element 10 during operation.

The apparatus of the present invention requires minimal modification to the trailer 70 or other blunt-nosed towed vehicle, and is acceptable for use on conventional, commercial vehicles with minimum tools necessary for assembly of the wedge-shaped fairing element 10. Also, the relatively available components comprising the present invention may be packaged as a kit in unassembled relationship for later simplified and facile assembly and securement to a trailer or similar blunt-nosed towed vehicle. The present invention may be therefore used on many different trailers as it would be completely removable and reapplied to another trailer within minutes and with ease for only one operator, male or female.

The wedge-shaped fairing element 10 of the present invention has proven to be quite successful in reducing the aerodynamic resistance of both head flow and cross flow of air during operation of blunt-nosed trailers or other similar towed vehicles.

I claim:

1. A windbreaker air drag reduction system for installation and securement adjacent to the forward face of a blunt-nosed trailer, said trailer including a forward extending hitching tongue member arranged for attachment to a motor vehicle hitch, and wherein said tongue member comprises a pair of bifurcated, angularly extending support beams terminating in an apex hitching element forwardly spaced from the forward face of said trailer, the system comprising:

a supporting cross member being transversely seated on and secured to the upper surface of said angularly extending support beams; and a pair of angularly disposed, upright panel members having their respective forward marginal edges providing the apex of a wedge-shaped fairing element, and with opposite sides of the respective panels being arranged for securement to the forward face of said blunt-nosed trailer.

2. The windbreaker air drag reduction system of claim 1, wherein the forward marginal edges of the respective panel members are each secured to an upright riser member.

3. The windbreaker air drag reduction system of claim 2, wherein the riser member comprises a pair of adjoining, angularly disposed supporting sides, and further wherein said supporting sides of said riser member are each respectively secured to the respective forward marginal edges of said upright panel members.

4. The windbreaker air drag reduction system of claim 2, wherein said riser member is of square tubing cross-section.

5. The windbreaker air drag reduction system of claim 2, wherein said riser member is of angle iron having adjoining, lengthwise sidewalls forming the apex, and each sidewall being secured to the respective forward marginal edges of said upright panel members.

6. A windbreaker air drag reduction system for a blunt-nosed trailer having a hitching tongue member, said system comprising:

a wedge-shaped fairing element arranged for installation and securement to the forward face of a blunt-nosed trailer;

said fairing element including a pair of angularly extending panels secured to one another at an angular apex located laterally forwardly of said forward face of said trailer;

said panels having adjacent marginal edges secured to one another at said apex and to an upwardly extending riser member;

said angularly disposed panel members having a portion of their inwardly located lower marginal edges secured to a horizontally disposed crossbar member; and said crossbar member being secured to the hitching tongue member.

7. The windbreaker air drag reduction system of claim 6, wherein the upright sides of said angularly disposed panel members are each secured at their inwardly located marginal edges to said forward face of said blunt-nosed trailer.

8. The windbreaker air drag reduction system of claim 6, wherein said riser member is of square tubing cross-section.

9. The windbreaker air drag reduction system of claim 6, wherein said riser member is angle iron having adjoining, lengthwise sidewalls forming the apex, and each sidewall being secured to the respective forward marginal edges of said upright panel members.

* * * * *